(12) United States Patent
Ulyanov

(10) Patent No.: US 9,700,028 B2
(45) Date of Patent: Jul. 11, 2017

(54) SURFACE LURE

(76) Inventor: Sergiy Vladlenovych Ulyanov, Dnipropetrovsk (UA)

( * ) Notice: Subject to any disclaimer, the term of this patent is extended or adjusted under 35 U.S.C. 154(b) by 213 days.

(21) Appl. No.: 14/367,936

(22) PCT Filed: Mar. 19, 2012

(86) PCT No.: PCT/UA2012/000030
§ 371 (c)(1),
(2), (4) Date: Jun. 22, 2014

(87) PCT Pub. No.: WO2013/100884
PCT Pub. Date: Jul. 4, 2013

(65) Prior Publication Data
US 2015/0000179 A1    Jan. 1, 2015

(30) Foreign Application Priority Data
Dec. 28, 2011  (UA) .............. A 2011 15542

(51) Int. Cl.
*A01K 85/00*  (2006.01)
*A01K 85/10*  (2006.01)
*A01K 85/14*  (2006.01)
*A01K 85/16*  (2006.01)
*A01K 85/01*  (2006.01)

(52) U.S. Cl.
CPC .............. *A01K 85/10* (2013.01); *A01K 85/00* (2013.01); *A01K 85/01* (2013.01); *A01K 85/14* (2013.01); *A01K 85/16* (2013.01)

(58) Field of Classification Search
CPC ........ A01K 85/00; A01K 85/18; A01K 85/16; A01K 85/14
USPC ............. 43/42.39, 42.47, 42.5, 42.51, 42.52, 43/42.48, 42.22, 42.02, 42.03, 42.11
See application file for complete search history.

(56) References Cited

U.S. PATENT DOCUMENTS

| 1,265,900 A | * | 5/1918 | Foss ....................... A01K 85/10 |
| | | | 43/42.52 |
| 1,333,154 A | * | 3/1920 | Buddle .................. A01K 85/16 |
| | | | 43/42.47 |

(Continued)

FOREIGN PATENT DOCUMENTS

| JP | 08154537 A | * | 6/1996 |
| JP | 2000245305 A | * | 9/2000 |

(Continued)

*Primary Examiner* — Darren W Ark
(74) *Attorney, Agent, or Firm* — Defillo & Associates, Inc.; Evelyn A Defillo

(57) ABSTRACT

The invention can be used for catching fish either directly over the surface of water or in the near-surface layer of the water. The surface lure has a longitudinally elongated convex curved plate, metal load, device for fixing a fishing line in the front portion of the lure, at least one hook at the tail portion of the lure. In front of and behind the metal load, there are provided two rods projecting upwardly in the vertical plane above the upper edge of the load and threaded with a gap through the holes of the longitudinally elongated and curved plate located on the top of the load. The device for fixing the fishing line is brought forward relative to the lure center of gravity and is arranged in front of the metal load at its lower edge with the indentation downwardly relatively to the longitudinal axis of the plate.

7 Claims, 2 Drawing Sheets

(56) References Cited

U.S. PATENT DOCUMENTS

| | | | | | |
|---|---|---|---|---|---|
| 1,393,790 | A | * | 10/1921 | Kenney | A01K 85/12 43/42.39 |
| 1,537,261 | A | * | 5/1925 | Pflueger | A01K 85/16 43/42.48 |
| 1,590,529 | A | * | 6/1926 | Larzelere | A01K 85/16 43/42.47 |
| 1,762,914 | A | * | 6/1930 | Lee | A01K 85/16 43/42.26 |
| 1,778,214 | A | * | 10/1930 | Fisher | A01K 85/14 43/42.52 |
| 1,813,722 | A | * | 7/1931 | Wright | A01K 85/16 43/42.47 |
| 1,914,211 | A | * | 6/1933 | Novitzky | A01K 85/14 43/42.5 |
| 1,925,197 | A | * | 9/1933 | Maynard | A01K 85/14 43/42.52 |
| 1,976,695 | A | * | 10/1934 | Boehm | A01K 85/16 43/42.47 |
| 1,994,678 | A | * | 3/1935 | Yarvise | A01K 85/00 43/42.48 |
| 1,997,900 | A | * | 4/1935 | Edwards | A01K 85/16 43/42.47 |
| 2,291,422 | A | * | 7/1942 | Thomas | A01K 85/14 43/42.39 |
| 2,312,585 | A | * | 3/1943 | Piro, Jr. | A01K 85/18 43/42.02 |
| 2,335,322 | A | * | 11/1943 | Taylor | A01K 85/01 43/42.48 |
| 2,448,523 | A | * | 9/1948 | Flbiger | A01K 85/16 43/42.39 |
| 2,492,064 | A | * | 12/1949 | Rauh | A01K 85/14 43/42.28 |
| 2,545,129 | A | * | 3/1951 | Zeigler | A01K 85/16 43/42.22 |
| 2,567,787 | A | * | 9/1951 | Sahutski | A01K 85/16 43/42.02 |
| 2,632,276 | A | * | 3/1953 | Hale | A01K 85/14 43/42.52 |
| 2,663,964 | A | * | 12/1953 | Martin | A01K 85/18 43/42.02 |
| 2,694,876 | A | * | 11/1954 | Grasser | A01K 85/16 43/42.47 |
| 2,741,058 | A | * | 4/1956 | Allman | A01K 85/16 43/42.39 |
| 2,770,063 | A | * | 11/1956 | Martin | A01K 85/16 43/42.02 |
| 2,775,839 | A | * | 1/1957 | Kuslich | A01K 85/16 43/42.03 |
| 2,812,609 | A | * | 11/1957 | Lema | A01K 85/16 43/42.52 |
| 2,828,572 | A | * | 4/1958 | Sargent | A01K 85/14 43/42.39 |
| 2,829,462 | A | * | 4/1958 | Stokes | A01K 85/16 43/42.48 |
| 2,884,733 | A | * | 5/1959 | Smith | A01K 85/14 43/42.52 |
| 2,892,280 | A | * | 6/1959 | Davis | A01K 85/14 43/42.5 |
| 2,906,053 | A | * | 9/1959 | Eales | A01K 85/14 43/42.51 |
| 3,055,138 | A | * | 9/1962 | Mutti | A01K 85/14 43/42.5 |
| 3,081,573 | A | * | 3/1963 | Mutti | A01K 85/14 43/42.51 |
| 3,154,877 | A | * | 11/1964 | Mutti | A01K 85/14 43/42.51 |
| 3,170,263 | A | * | 2/1965 | Purdy | A01K 85/14 43/42.5 |
| 3,175,324 | A | * | 3/1965 | Blackwell | A01K 85/14 43/42.03 |
| 3,377,734 | A | * | 4/1968 | Snow | A01K 85/16 43/42.39 |
| 3,675,358 | A | * | 7/1972 | Jones | A01K 85/14 43/42.09 |
| 3,771,251 | A | * | 11/1973 | Stamy | A01K 85/14 43/42.5 |
| 4,047,317 | A | * | 9/1977 | Pfister | A01K 85/01 43/42.06 |
| 4,202,127 | A | * | 5/1980 | Marek | A01K 85/14 43/42.11 |
| 4,210,984 | A | * | 7/1980 | Koenig | A01K 91/04 43/42.09 |
| 4,219,956 | A | * | 9/1980 | Hedman | A01K 85/00 43/42.39 |
| 4,254,573 | A | * | 3/1981 | Mastropaolo | A01K 91/08 43/43.13 |
| 4,367,607 | A | * | 1/1983 | Hedman | A01K 85/00 43/42.1 |
| 4,453,333 | A | * | 6/1984 | Olson | A01K 85/00 43/42.5 |
| 4,628,629 | A | * | 12/1986 | Rocchietta | A01K 85/10 43/42.19 |
| 4,771,567 | A | * | 9/1988 | Cannon | A01K 85/00 43/42.39 |
| 4,907,364 | A | * | 3/1990 | Hedman | A01K 85/00 43/42.39 |
| 5,003,723 | A | * | 4/1991 | Dutcher | A01K 85/14 43/42.13 |
| 5,058,309 | A | * | 10/1991 | Firmin | A01K 85/00 43/42.22 |
| 5,226,268 | A | * | 7/1993 | Sisson, Jr. | A01K 85/00 43/42.11 |
| 5,228,230 | A | * | 7/1993 | Vaught | A01K 85/00 43/42.39 |
| 5,414,952 | A | * | 5/1995 | McLaughlin | A01K 85/16 43/42.5 |
| 5,461,819 | A | * | 10/1995 | Shindledecker | A01K 85/14 43/42.39 |
| 5,673,508 | A | * | 10/1997 | Snyder | A01K 85/00 43/42.37 |
| 5,842,302 | A | * | 12/1998 | Soma | A01K 85/14 43/42.11 |
| 6,505,432 | B2 | * | 1/2003 | Brinkman | A01K 83/06 43/42.02 |
| 6,658,784 | B1 | * | 12/2003 | Mastropaolo | A01K 91/08 43/42.22 |
| 6,865,842 | B2 | * | 3/2005 | Brinkman | A01K 85/00 43/42.02 |
| 7,028,430 | B2 | * | 4/2006 | Gironda | A01K 85/14 43/42.39 |
| 7,380,366 | B1 | * | 6/2008 | Barrow | A01K 91/08 43/42.22 |
| 7,621,068 | B1 | * | 11/2009 | Renosky | A01K 85/01 43/42.39 |
| 7,726,062 | B2 | * | 6/2010 | Davis | A01K 85/02 43/42.39 |
| 7,963,066 | B2 | * | 6/2011 | Perrick | A01K 85/00 43/42.47 |
| 8,359,782 | B1 | * | 1/2013 | Alzamora | A01K 85/00 43/42.5 |
| 8,397,425 | B1 | * | 3/2013 | Alzamora | A01K 83/00 43/42.02 |
| 8,468,737 | B2 | * | 6/2013 | Simmons | A01K 85/00 43/42.39 |
| 8,656,633 | B2 | * | 2/2014 | Renosky | A01K 85/00 43/42.39 |
| 8,733,012 | B2 | * | 5/2014 | Thorne | A01K 85/14 43/42.24 |
| 8,739,460 | B2 | * | 6/2014 | Thorne | A01K 85/00 43/42.15 |
| 8,844,190 | B2 | * | 9/2014 | Comeaux | A01K 85/14 43/42.5 |
| 8,938,907 | B2 | * | 1/2015 | Meade | A01K 85/02 43/42.47 |
| 8,973,298 | B2 | * | 3/2015 | Thorne | A01K 85/00 43/42.15 |
| 9,161,521 | B2 | * | 10/2015 | Thorne | A01K 85/00 |
| 9,253,966 | B2 | * | 2/2016 | Scholfield | A01K 85/01 |

(56) References Cited

U.S. PATENT DOCUMENTS

| | | | | |
|---|---|---|---|---|
| 9,253,967 B2* | 2/2016 | Davis | ............... | A01K 85/02 |
| 2005/0086849 A1* | 4/2005 | Perrick | ............ | A01K 85/08 |
| | | | | 43/42.47 |
| 2006/0191186 A1* | 8/2006 | Perrick | ............ | A01K 85/00 |
| | | | | 43/42.47 |
| 2007/0101636 A1* | 5/2007 | Dolence | ............ | A01K 85/16 |
| | | | | 43/42.47 |
| 2008/0127541 A1* | 6/2008 | Shelton | ............ | A01K 85/00 |
| | | | | 43/42.08 |
| 2008/0172924 A1* | 7/2008 | Thorne | ............ | A01K 85/00 |
| | | | | 43/42.39 |
| 2011/0197492 A1* | 8/2011 | Fowler | ............ | A01K 91/08 |
| | | | | 43/4.5 |
| 2012/0167446 A1* | 7/2012 | Ul'Yanov | .......... | A01K 85/16 |
| | | | | 43/42.03 |
| 2014/0190065 A1* | 7/2014 | Ulianov | ............ | A01K 85/14 |
| | | | | 43/42.19 |
| 2015/0007483 A1* | 1/2015 | Thorne | ............ | A01K 85/16 |
| | | | | 43/42.39 |
| 2016/0106081 A1* | 4/2016 | Thorne | ............ | A01K 85/18 |
| | | | | 43/42.39 |
| 2016/0235049 A1* | 8/2016 | Thorne | ............ | A01K 85/00 |

FOREIGN PATENT DOCUMENTS

| | | | | |
|---|---|---|---|---|
| JP | 2002360125 | A | * | 12/2002 |
| JP | 2003204734 | A | * | 7/2003 |
| JP | 2005192512 | A | * | 7/2005 |
| JP | 2007209275 | A | * | 8/2007 |
| JP | 2009171950 | A | * | 8/2009 |
| JP | 2010094103 | A | * | 4/2010 |
| JP | 2010154763 | A | * | 7/2010 |
| RU | 1805846 | A3 | * | 3/1993 |

* cited by examiner

SURFACE LURE

The invention relates to amateur and sport fishing and can be used for catching predatory fish either directly over the surface of water with the lure ability to appear onto the surface of water particularly when posting at low speed, or for posting in the near-surface layer of water, and also it can be suitable for fishing with a spinning by means of uniform posting method and also twitching technique.

There are known floating lures having volumetric body designed exclusively for the use over the surface of water.

The surface wobblers are the kind of the wood and plastic lures. They are designed for catching predatory fish living in high levels of water and they are usually equipped with additional devices in the form of blades or impellers that while driving produce incredible noise over the surface of water. The predators are attracted with any noise and splash that occur while a wobbler moving over a smooth surface of water. Some surface wobblers have large front blades resembling fish fins or boat paddles. At posting, the fins loudly clap like a swimmer in the pool.

The others surface wobblers, due to the availability of the concave front portion (something like kayak), while posting with sharp twitches, make sounds resembling a frog's croak. In the art, there is a description of another surface lure called «jerkbait». Posting of this surface wobbler looks like a series of short pulls, rather the jerks, whereat the wobbler burrows into water making specific gurgles [В.Н.Блищ, Современный спиннинг. Москва, Аквариум, с. 85-86, 2003]. [V. N. Blisch. Modern Spinning Technique. M. OOO Publishing house Astrel, 2003, p. 85-86.]

Furthermore, there are known bladeless lures having a volumetric floating body that are directly designed for the use over the surface of water. The surface lures should not be posted uniformly, as while being at uniform posting, they usually don't provide playing. They should move jerkily, rather slow and thus make noise and splutter, perform waves and create bubbles. [Братья, Щербаковы. Ловля щуки. ООО «Издательство Астрель», с 131, 2003]. [Brothers Scherbakovs. Pike fishing. M. OOO Publishing house Astrel, 2003, p. 131.]

Such lures usually provide no own play, and they cannot be used for uniform posting or for at least posting with slight deep. Therefore, they are mainly effective for the use in summer at quiet and windless weather when there are no waves on the surface of water.

Also there are known such lures as poppers with a lightweight volumetric body having a recess in its nose portion and creating gurgle and noise at twitching over the surface of water. The poppers have low dead weight, and they are not intended for long casts.

There is also known a lure designed for the use in the surface layer of water that is named as 'wobbler'. Such a lure comprises a body in the form of a fish made of the material having a density less than the density of water and with loops for hooks and a fishing line. The lure comprises a metal plate, which is embedded into the nose potion of the body and bent at an angle of 45 degrees to the horizontal plane of the body, whose center of gravity is arranged at its head portion [RU 2056750 C1 A01k 85/14, 1996].

Wobbler can be manufactured for using it at performing either uniform or interrupted posting with jerks or stops, that is, the twitching technique. As it is known from the art, non-uniform posting for any lure should be considered as most effective posting.

The surface wobblers having the same body as the diving ones, but a small blade arranged at a large angle, would operate in the surface layer [Братья Щербаковы. Современный СПИННИНГ. ООО «Издательство Астрель, с.131, 2003] [Brothers Scherbakovs. Modern Spinning Technique. M. OOO Publishing house Astrel, 2003, p. 131.]

The wobbler, which is equipped with a blade at the front portion, when driving, is deepening, and it is not used for posting just over the surface of water. Furthermore, the wobblers usually fly not far when being thrown and are not intended for long distance throws.

This happens because the wobbler is rather light and sailing lure, which cannot be thrown for a very long distance. [Братья, Щербаковы. Ловля щуки, ООО «Издательство Астрель», с 115, 2003]. [Brothers Scherbakovs. Pike fishing. OOO Publishing house Astrel, 2003, p. 115.]

All of the above said lures are exclusively specialized either for fishing over the surface of the water, or for posting in a near-surface layer, and they have the properties to create oscillations and/or twitching wags depending on the design and purpose of the lure, which properties are typical for deepening lures, or to create noise, gurgles and waves on the surface of water, which are usually provided by the surface lures. But none of the mentioned lures have the above properties combined in a single structure, and, therefore, they are not universal. Those lures have got a light volumetric body providing their operations at the surface, and most of them have no good flight characteristics.

There is known a vibrating lure comprising an elongated holder with at least one hole for fixing the fishing line, a load at its front portion, a hook at its rear portion, and a plate movably attached to the holder, the holder being corresponding to the length of the lure is performed as a convex curved metal axle (shaft), which front and rear portions are bent downwards in the vertical plane and are threaded with a gap into two holes of the longitudinally elongated plate, those holes being performed in the front and rear portions of the plate on its longitudinal axis that is also its axis of symmetry. The ends of the bent portions of the holder are diverged apart. The load is attached at the front end of the bent portion of the holder, and at the rear portion, there is a loop for the hook. The holes for attaching the fishing line are performed on top of the holder in the vertical plane, and they are arranged above the longitudinal axis of the plate over the area between the nose and middle portions of the plate. Those holes are offset rearwards relative to the center of gravity of the lure. The plate being arranged with its longitudinal axis lengthwise to the holder is performed either flat, or its lateral portions are symmetrically convex curved upwards relative to the longitudinal axis of the plate. The plate is performed with the possibility of rotation around its longitudinal axis in both directions and with the possibility for approach of the raised lateral portions of the plate, which is maximum turned to each side, at the same distance relative to the vertical plane passing through the axis of rotation of the plate and the longitudinal axis of the holder without reaching the mentioned vertical plane by the lateral portions [Invention application A201111199 of 20 Sep. 2011].

The design of the above mentioned lure, namely, the holder with a load that is brought into its front portion, and with the rods that are lowered down at its front and rear portions, the plate located under the holder and having the side portions that are symmetrically curved upwards, the point for fixing the fishing line raised over the holder and arranged after the load and behind the lure center of gravity above the plate portion located between its nose and middle portions, provide such a constant and inclined arrangement of the plate surface while operating the lure whereat the nose portion of the plate is lowered down beneath its rear portion. Accordingly, while driving, on the plate, there is appeared the deepening force directed downward; and under the influence of this force, the lure sinks to the bottom overcoming the buoyancy force and the force of the lure resistance to the water flow. Changing any of the design features of the lure makes it impossible to operate the lure as a whole.

This lure has good flight characteristics, and as in motion, it creates active vibrations of different frequencies and amplitudes. The lure independently deepens and steadfastly operates in a great range of speeds at maintaining the working depth of deepening.

However, the lure can operate neither over the surface layer of water, nor in the subsurface one, because even at the lightest load, it is going on actively deepening in the process of movement. In addition, at twitching, the lure has no tendency to a significant deviation from the direction of its motion, which fact makes ineffective jerk and twitch posting of such a lure.

Thus, the said lure in any design implementation cannot be directly used for fishing at the near-surface or over the surface of water and it is intended for trolling, jigging, or plumb baiting at considerable and great depths.

In addition, the load that is forwardly projected relative to the lure and bent down during its motion, reduces the possibility of engaging the lure by driftwood and bottom barriers, which fact facilitates pulling the lure out when engaged at trolling. However, when jigging, such a load clings to algae making impossible normal posting of the lure, which under such a condition stops oscillating and loses attractiveness for a predator. This feature precludes the possibility of applying the lure in shallow areas of ponds with aquatic vegetation that grows up from the bottom. At the same time, the near-surface fishing is the most effective technique, first of all, in the shallow and grassy parts of reservoirs.

To fish over the surface of water, there are used metal, in particular, in-line spinners of light weight and significant drag.

There is known an in-line spinner, which design is based on a metal petal that rotates round the wire axle at posting in water. Typically, the axle passes either directly through the hole in the petal, or through the shackle-collar, wherein the petal hangs [Братья Щербаковы. Современный СПИННИНГ. ООО «Издательство Астрель», с 105, 2006]. [Brothers Scherbakovs. Modern Spinning Technique. OOO Publishing house Astrel, 2006, p. 105.]

A design feature of the said in-line spinner is that fact that its petal is connected to the axle at a single point with a possibility to move freely relative to the axle, in particular, deviate from it with the free end, respectively, changing the angle of the petal inclination relative to the axle.

The in-line spinners can be also divided into two big groups, that is, with front balance-weight, and with rear balance-weight. In the in-line spinner with the front balance-weight, the weight is arranged before the in-line spinner. The in-line spinners with the front balance-weight can be thrown farther, as their weight and size practically make no influence on the size of a petal [Современный СПИННИНГ. Братья, Щербаковы «Издательство Астрель», 2006, с. 115-116] [Brothers Scherbakovs. Modern Spinning Technique. OOO Publishing house Astrel, 2006, p. 115-116.]

In clear water the in-line spinners attract a predator attention by shimmering glitter of the petal being similar to a scale sparkle of a small playable fish. The strongest oscillations are created by the in-line spinners having large and wide petals. When moving, these in-line spinners have high drag creating an opportunity to provide their posting directly in the near-surface layer of water.

The in-line spinner has certain features that reduce the versatility of its application.

In particular, the nature of the vibrations created is of crucial importance to ensure the effectiveness of the in-line spinners. In some cases, the predator is attracted by the lures generating sharp oscillations and vibrations, and the in-line spinners creating soft and uniform vibrations are not effective. The in-line spinners can only create the vibrations of one intensity and frequency. To change the type of vibrations, it is necessary to use another lure.

The in-line spinner oscillations are radiated by the petal during its smooth uniform rotation, and therefore, the character of the oscillations, which are soft and uniform vibrations occurring during the smooth rotation of the curved plate in a flow of water, fundamentally distinguish the oscillations of the in-line spinners from the vibrations produced, for example, at swinging from side to side of the other types of lures.

Taking into consideration the fact that the plate, which gently rotates in the flow of water, is arranged with its convex side oppositely the oncoming flow of water, it creates no significant lateral forces deflecting the in-line spinner axle to the side. The in-line spinner moves almost straightforwardly without yawing from side to side, and such a situation makes it impossible to apply the in-line spinner at fishing with the use of twitching method, namely, by twitching the in-line spinner with its deviation sideways, which method is effective in the near-surface posting. Accordingly, the in-line spinner is not intended to create active vibrations in water by intensive wags and swings from side to side.

At the same time, the character of the vibrations generated by the lure is crucial to ensure the effectiveness of the same. Therefore, in some cases the predator is attracted by the lure generating strong pulse oscillations created with the help of the lure yawing from side to side or having an ability to produce rhythmic oscillations at uniform posting, deviate to the sides at twitching, and rather slowly descend on stopping with continuing to generate oscillation.

In addition, the uniformly rotating petal of the in-line spinner constantly changes its angle of deflection, relative to the oncoming flow of water in the vertical plane, for exactly opposite angle. The petal of the in-line spinner creates a lifting force outputting the in-line spinner onto the surface when it moves at operating mode of posting. At posting, the in-line spinner moves only in the surface layer due to the significant own drag.

Accordingly, the in-line spinners can be used only when posting in the layer of water, and it is not intended for operation upon appearing over the surface of water.

The in-line spinner has the following disadvantages.

At applying the type of in-line spinners, it is impossible to implement combined posting whereat the in-line spinner passes a part of the distance under water while moving uniformly, or yawing and creating different types of oscillations, but doing so, the in-line spinner is periodically brought to the surface creating noise, gurgles and spreading waves. This lure is effective at catching a predator over the surface, particularly, in shallow water.

The in-line spinner applied for posting in the upper layer of water, that is in-line spinner having a small net weight and a significant size of the petal, is not intended for a long-distance throws, which are necessary for catching certain types of fish.

At casting, the in-line spinner is often engulfed by the fishing line over a hook. Because of the fact that in the in-line spinner there is used a petal attached to the axle of the in-line spinner at one point and having a high degree of freedom, except rotation, it is also free to deviate from the axis of the spinner at any angle, and at casting the spinner with a load arranged on the axle behind the plate, that plate sails creating significant resistance at flying, randomly moves and trembles, preventing the long distance throws of the in-line spinners. For the same reason, the spinner flies unstably, it tumbles resulting in frequent engulfing of the fishing line over the hook of the in-line spinner.

Applying the in-line spinners having a load arranged in the nose portion causes the plate, having already rotated in the air, to create even greater resistance to the flight, which fact results in increasing the drag and shortening the flight range. In addition, in such spinners, engulfing of fishing line over a hook occurs more frequently as the load provides flying of the spinner with the axis position at horizontal plane, while the fishing line, being attached to the spinner in the nose portion, is adjacent to the axle and lies down on the hook arranged at the tail portion of the spinner right on its axle (axis). To eliminate this phenomenon of the spinner with a front load, there is often used a hard wire for fishing leash, which cannot completely eliminate the problem, and which is an additional element alarming some types of predator.

When using spinners, there might be occurred twisting of a fishing line as operating the spinner is based on the non-interrupting rotation around a thin axle. The continuous rotation of the petal results in gradual twisting of the thin axle whereon it is located, as the process of rotation of such an axle substantially meets no resistance in water flow. At the present time, there are widely used the expensive braided cords as fishing lines (their cost is many times more then the cost of the spinners) having high strength, wear resistance and durability, and the use of the in-line spinner results in rapid damage of the cords. To prevent this phenomenon at using the in-line spinners, there are additionally applied various devices protecting a fishing line from twisting, but the problem has not been solved in principle. In addition, such devices for protecting a fishing line from twisting can scare off the predators.

The in-line spinner with a load arranged in the middle portion of the same operates stable only at achieving a certain speed. Since the in-line spinner is connected with a fishing line in the spinner nose portion, while the spinner is performing the slow movement, the axle is arranged in an inclined position, wherein the plate is studded onto the axle, and its rotation gets impossible. As soon as the required speed of the in-line spinner had achieved, the spinner axis occupies a position close to the horizontal one, and the plate starts rotating without hindrance. Accordingly, to start and provide the stable operation of such a kind of spinners, there is need in a special value of speed, below which the plate stops rotating. Usually a predator prefers a slow moving lure, and in some cases, there is need in applying a lure moving slower than in-line spinners. In addition, while accelerating without any oscillations, at frequent stopping and recommencing posting, the in-line spinner runs inefficiently a part of its way under the water. The in-line spinner with a load in the middle portion of the same is unsuitable for the bottom posting at great depths, because it immediately floats up, and stops operating after having interrupted movement, and falls onto the bottom.

The technical solution being the closest one to the present invention is an in-line spinner comprising a plate with holes, which is performed with the possibility of rotation, an assembly unit for fixing a fishing line, a loop for attaching a hook, and the hook. To attach the hook, between the assembly unit for fixing the fishing line and the loop for attaching the hook, there is arranged a rectilinear central rod carrying thereon a bead with a stop performed in the point for attachment of the fishing line, which rod being threaded through the holes of the plate that has a periodically (irregularly) curved shape of at least one period in the plane relative to the central rod; and in the perpendicular plane, the plate has an elongated shape being similar to the configuration of the lure body; thus, in the area of the location of the loop for the hook attachment, the plate has blades bent in different directions to ensure its rotation round the rod under the action of the counter-flow of water while posting the spinner at one or another depth, or over the surface of water with a stable continuity of the rotation [RU No 2311765, A01K85/00, 2005].

The above said lure operates because of continuous rotations of the plate. Through two holes of the lure, there is stretched the rod with a bead functioning like a slide bearing when operated. The rotation of the plate, which is essentially a kind of a turbine, is ensured by the blades bent in different directions and disposed at the rear portion of the plate.

The lure is designed without the use of a load, which as required may be optionally mounted in front of the spinners before the loop for attaching the fishing line.

When posting lure at the depth or over the surface of water, under the influence of the oncoming flow of water, it operates with the stable continuity of the plate rotation.

Unlike the in-line spinner with a single point for the attachment of the plate to the axle, the plate of the said in-line spinner is fixed on the longitudinal axle (axis) at two points, and, therefore, it does not arbitrarily deviate from the axis when casting the spinners and at the beginning of the spinner movement. Accordingly, the plate of the spinner is constantly in its operative position, and, therefore, the lure starts operating immediately after beginning the spinner posting. This feature significantly reduces the speed threshold, at which there is provided the spinner stable operation, and respectively, it increases the efficiency of its use.

Unlike the in-line spinner with a plate which is attached to the axle at one point, this in-line spinner may be used for posting over the surface of water taking into account the following exceptions. Thus, since the plate of the spinner continuously rotates around its longitudinal axis, its plane does not deviate at any or some fixed angle in the vertical plane from the direction of the spinner movement, so the plate moving in the flow of water, does not perform a function of a wing and creates no lifting force. With this in mind, while moving, the in-line spinner can only appear onto the surface due to the buoyancy force of the fishing line and the drag created by the plate rotating when the spinner being in motion. Accordingly, at equipping the spinner with a load, it will not be able to float without special design elements creating a lifting force. The absence of the design component that creates the lifting force makes it possible to post the spinner over the surface only when it is made of a low net weight and with a large size of the plate. At the same time, this spinner would be poorly thrown and flies for a short distance.

This lure has the following drawbacks limiting its versatility, reducing its effectiveness and creating inconveniences while fishing.

The character of oscillations for such an in-line spinner is the same as for the other in-line spinners, namely, those are soft and constant vibrations performed by the continuously rotating plate. Since in the course of the spinner movement the maximum resistance of the oncoming flow of water is created by the blades separated to both sides, which blades are located in the tail portion of the spinner, the spinner of such a design does not allow its tail portion to deviate to the sides hereby providing a straightforward direction of its motion.

The plate is periodically curved in relation to the straight central portion of the rod, and it has no curved side edges. Such a curvature of then plate allows threading the rod through the plate, as well as it contributes to the creation of additional vibrations when driving spinners. However in the course of the uniform rotation of the plate, such a curvature creates no significant or any other deviations of the spinner to the sides from the direction of its movement.

The lure has no design elements ensuring its deviations to the sides at twitching or yawing by means of increasing its speed, therefore, the lure is not intended for performing jerk posting, whereat it yaws from side to side. For the same reason, the lures cannot create pulse oscillations of high amplitude and low frequency, which in some cases are similar to the wobbler oscillations being extremely attractive to predators.

Since the plate is in essence a turbine rotating only when the flow of water is bypassing it along its longitudinal axis, in the case of a lure stop condition, the plate interrupts rotation and the lure descends without attracting predators.

Since the lure has a plate with the dimensions corresponding to the general sizes of the spinner and, accordingly, a large area of the surface, when casting the lure without a load, it will sail and fly only for a short distance. In the case of attachment of the extra load, it can be attached to the lure only at its nose portion. Accordingly, while casting, the lure will fly with its nose portion directed forward, and in flight, the plate will be kept in its operating position, and it will rotate partially exhausting the energy required for flight. Furthermore, since the fishing line and a hook are located on the same rectilinear axis of the lure, at flying the lure with a load, the lure will fly with a load directed forward, and the fishing line that is located in the nose portion will pass along the lure axis directly contacting with the hook-equipped tail portion, which raises the danger for creating interlacing between the hook and the fishing line while casting, like in the other in-line spinners with a front load. Having a front load, the lure will descend with its nose portion being forward, at rotating and creating oscillations, but it can not be used for posting over the surface of water.

The design of the lure with a plate, which rotates from its nose portion to the tail one, makes it impossible to provide the lure with an additional hook in the middle part of the lure. Availability of only one hook in the tail portion of the lure raises the possibility of a predator attacks without engaging it over the hooks.

The design of the lure with a plate that looks like as turbine, in comparison with the in-line spinner having a single point for the attachment of the plate to the axle of rotation, makes it possible to rotate the plate only to one direction. This feature greatly enhances the general characteristic of the in-line spinner to twist fishing line at operating this lure. Using such a lure without a separate load, which could to some extent resist against twisting the fishing line, further increases the possibility of twisting the fishing line.

The lure that is designed to catch fish with access to the surface of water should be light in weight and have a plate of large area, therefore, the lure operating over the surface, is not designed for long cast fishing.

The technical problem of the invention is by changing the known design to create the surface lure for amateur and sport fishing, which would have the opportunity of compact design solution, good flight characteristics and long distances throws, would be designed for catching predatory fish directly over the surface of water, particularly, when posting at low speed, as well as in the near-surface layer of water, and also would be suitable for fishing with spinning either at uniform posting or at jerk posting, namely by twitching method.

The problem is solved by the fact that in the surface lure comprising a longitudinally elongated convex curved plate, a metal load, a device for fixing a fishing line in the front portion of the lure, at least one hook at the tail portion of the lure, according to the invention, the metal load is performed longitudinally elongated, flattened in the vertical plane, with the upper edge being of narrowed and rectilinear form or concave form in the middle of the same; in front of and behind the metal load, there are provided two rods projecting upwardly in the vertical plane above the upper edge of the load and threaded with a gap through the holes of the longitudinally elongated and curved plate located on the top of the load, the holes are performed in the front and rear portions of the plate on its longitudinal axis, which is also its axis of symmetry; the ends of the rods being longitudinally separated apart or directed towards each other; the device for fixing the fishing line is made in the form of an eyelet or a vertical and flat projection in front of the load with a hole, which hole or eyelet being brought forward relative to the lure center of gravity and they are arranged in front of the metal load at its lower edge with the indentation downwardly relative to the longitudinal axis of the plate; the side portions of the longitudinally elongated curved plate are symmetrically bent downward relative to its longitudinal axis, while the plate is attached to the load with the possibility of its rotation about its longitudinal axis in both directions through the same angle from the position, at which the side edges of the plate are located symmetrically with respect to the load; and at least one hook at the tail portion of the lure is attached to the load at its rear portion or to the curved back convex end of the rear rod The metal load may be weighted at its front or rear portion.

Inside the metal load, there can be located a longitudinal reinforcing plate that protrudes at top of the load and/or its ends protrude as vertical flat projections behind and/or in front of the load.

The front portion of the metal load may be performed extended and has cavities directed forward or downward at an angle, or it may be equipped with an additional spherical or oval concave petal disposed vertically and inclined downward at an angle so that the eyelet for fixing the fishing line could protrude from the middle portion of the concave surface of the oval petal.

The rods may be performed protruding upward directly from the front and rear portions of the load, or protruding upward directly from the front and rear ends of the flat projections on the load ends, which projections being formed by the ends of the reinforcing plate.

The ends of the rods directed towards each other may be integrally connected or they cannot reach each other, or in addition, they may be turned to the load and threaded through two additional plate holes performed on its longitudinal axis.

The device for fixing the fishing line may be performed as a hole in front of the lower edge of the load, on the bottom edge of the flat projection formed by the rounded front end of the reinforcing plate that protrudes in front of the load, or as a loop or eyelet, made just at the rounded lower edge of the front portion of the load.

The longitudinally elongated plate can have rounded nose and tail edges or the symmetrical projections in the front portion, or the plate can be extended in the front, middle or rear portion.

The side portions of the longitudinally elongated plate that are symmetrically curved down may have the same or different degrees of curvatures for the front and rear portions, and the curvatures may be of cylindrical, conical, spherical, faceted or combined form, or the plate may have a higher degree of curvature of the middle portion along the longitudinal axis and flattened or flat portions along the side edges.

The longitudinally elongated plate may have at its front portion, or along thereof, either one or two cavities of globular, spherical, conical or combined form with a greater degree of curvature of the rear surface of the cavity, which are performed with complementary holes in the upper portion of each cavity, and the cavities can be symmetrically stamped relative the longitudinal axis and arranged with their concave surfaces on the lower concave surface of the plate, or on the longitudinal axis of the plate, there are formed the additional holes.

The longitudinally elongated plate may have a nose edge being further symmetrically bent up or down, or it may have side edges in the middle and/or in the front portion of the plate being further symmetrically bent downward.

The longitudinally elongated plate may be made of metal or plastic and having the same thickness or with the thinner side portions.

The surface lure may contain an additional hook movably attached to the eyelet performed in the middle portion of the load at its lower edge.

The hook in the tail portion of the lure may be movably connected to the load via the hole performed in the flat projection behind the load, which projection being created by the rear end of the reinforcing plate protruding there from the load, or via the eyelet protruding backward from the rear end of the load, or via the loop formed at the bent-back end of the rear projecting rod, or it may be attached fixedly at those points of locations.

The hook at the tail portion of the lyre may be provided with synthetic or fur tassel being attached with the possibility of removal.

The claimed surface lure is compact, has good flight characteristics and can be thrown for a long distance It is designed for catching predatory fish either directly over the surface of water, with creating gurgling, noise, and wavelets, with a possibility of access to the surface of water, particularly, when posting at low speed, or it can be used for posting in the near-surface layer. While moving in the water, it creates active vibrations, even at low speed of posting, provides wagging at jerks, and it is suitable for fishing with spinning either at uniform posting or at twitching method, and it always remains attractive to predators even during pauses when posting.

Unlike the prototype, the surface lure combines compactness, weight and small cross-section. And the plate of the lure is attached at two points and has a limited degree of freedom hereby stabilizing the position of the lure in flight without creating significant resistance that allows it performing long casts.

As the fishing line of the lure is attached to the front portion of the same, and the load is stretched along the whole lure, due to the resistance of the fishing line, while being in-flight, the nose portion of the lure is flying behind, and the tail portion with a load—in front. Thus, the fishing line, when in-flight, does not pass near the hook. This design feature eliminates entanglement of the fishing line on the hook either in the course of casting the lure, or in the course of immersing the lure into the water. With the additional hook located at the bottom of the middle portion of the load, it also flies in front of the point of the fishing line attachment.

The claimed surface lure has a design wherein the plate of the lure not only performs the function of providing vibrations during the lure movement, but also operates as a wing creating the lifting force in the course of the lure motion in the flow of water. This is the property, assured by a combination of high weight and structural compactness, enables the lure even at a low speed to move over the surface of water and also in the near-surface layer of water.

When performing uniform posting over the surface of water, the lure is moving so that the nose portion of the plate with its side portions bent downward is disposed above the surface of water in such a way that, during the lure movement across the surface, this portion of the plate captures air, which while moving, is pushed into the area under the immersed portion of the plate and leaves this area with gurgling through its front hole and from under the side edges. In addition, while passing the lure over the surface, the water with splash flows around the nose portion of the plate projecting above the surface and diverges at sides in the form of whiskers. At the same time, since the middle and rear portions of the plate go on moving under water, the plate continues to oscillate, providing for the attraction for a predator not only by gurgling and splashing, but also performing the rhythmic vibrations.

At performing jerks or acceleration of under-winding the fishing line, the lure moved over the surface or directly in the near-surface layer of water, at the opinion of the fisher, partially or completely rises above the surface. At the same time after appearing over the surface, the lure sinks back into the water and together with the plate, which had already trapped some air, goes under water creating much noise and gurgle. Moreover, since at jerks or acceleration of under-winding, the fishing line is deflected away from the direction of motion, the trajectory of its motion over the surface is of zigzag form. Thus, at immersing, the plate crashes into water not frontally, but at an angle creating strong splashes and leaving air bubbles along the path of movement.

When driving submerged, the lure creates persistent oscillations in a wide range of speeds starting to operate directly at the moment of beginning the movement.

The availability of the rotatable plate, whose angle of rotation depends on the speed of the lure movement, provides the lure operability at the lowest speed of movement, and also provides the ability for a single lure to create two modes of operation, namely, two types of oscillations at uniform posting depending on the speed of posting for the lure, that is, yawing oscillation of large amplitude and low frequency, and vibrating oscillation of high frequency and small amplitude of vibrations. Thus the speed threshold for transition from one type of oscillation to another is in the operating range of speeds and determined structurally. At performing jerks, the lure sharply deviates in different directions from the direction of the movement with the angle of deflection in the horizontal plane up to 60 degrees from the direction of movement. This fact allows performing jerk posting, that is twitching, and the lure looks like a frightened fish that throws itself to different sides.

The availability of the plate resembling a wing above the elongated load provides attractiveness of the lure even at the moments of the termination of posting as at those moments the lure is not falling, but slowly descending, while continuing to create vibrating oscillations and maintaining position in space being close to horizontal one.

The combination of those features allows to actively control the lure in the course of near-surface posting with choosing the most attractive type of oscillation, combine uniform jerk posting (twitching) and/or with stops (jig posting).

During the movement of the lure, to the plate located in the upper portion of the lure, there is applied a lifting force being pointed upward, and to the bottom portion with a load thereat, there is applied a force of gravity, making it impossible to perform the rotations of the lure in motion, and accordingly, it eliminates the risk of twisting the fishing line.

In the course of the lure motion, the plate turns to the sides around the longitudinal axis and hits the load without any additional devices creating noise that attracts predators.

Being curved upward, the rod portions should be of the length allowing the plate rotating around its longitudinal axis, and these portions can be of the same length or slightly different in the length.

Thus, being universal for fishing a predatory fish that prey on the surface, the claimed lure combines the beneficial features of several types of surface and near-surface lures, which fact increases the efficiency of its use.

The additional curvature made on the concave curved lower surface of the plate, the additional holes in the plate, the expansions and the cavity in the front portion of the load may be performed in the models that are mainly used for fishing over the surface and intended for additional capturing air at the appearance of the lure above the surface of water and providing stronger gurgling and noise after immersing the lure into the water.

Increasing the degree of the plate curvature, in particular, at its tail or nose portion results in enhancing the function of yawing for the lure and thus weakening the function of surfacing. There is a possibility to select a degree of curvature of the plate, whereat the lure while making moderate yaws continues to perform the active vibrations.

To create the model with the active oscillations and at the same time being intended for operating over the surface, it is advisable to use a plate with a significant degree of curvature and a lighter load. The additional downward directed curvatures of the front side edges of plate 1 that is extended in front provide the sharper oscillations of the lure at yawing.

The upward directed curvature of the nose edge of the lure promotes more rapid surfacing of the lure at casting, and it is appropriate only in models working mainly over the surface.

In addition, the nose edge curvature directed upward increases the opportunity for yawing of the lure at posting. The same effect is resulted from increasing the length of the vertical rods protruding over the edge of the load and also increasing the size of the plate relative to the size of the load, mainly due to lengthening the nose portion of the plate, which thus projects forward relative to the front end of the load The additional symmetrical curvatures directed downward of the front portions of the side edges provide for increased vibrations of the models having a plate with a front portion that is substantially flattened, and are preferably intended to work over the surface.

The additional symmetrical curvatures of the side edges of the plate that are directed downward in the middle of the same are suitable for enhancing the function of yawing the lure, as well as for additional entrapment of air in order to strengthen gurgles and noise at appearing the lure over the surface of water.

The use of the lure having a lighter load in the same model worsens casting distance while improving the efficiency of the yawing functions and the surfacing functions as well. Thus, for the lures especially designed for fishing in overgrown ponds, wherein casting distance does not matter, it is advisable to use a lighter load in comparison with the lures of the same size and type, but designed to cast for a long distance.

The use of the weighted load in the front portion of the lure is more appropriate for the lures designed for fishing underwater, as in this case, there is improved the yawing function, and the use of the weighted load in the rear portion of the lure reduces the effect of the lure yawing at posting and more suitable for the lures designed for surfacing. In addition, the use of the lures with the weighted load in the rear portion is suitable for the lures intended for a longer distance casting.

Using a plate having a greater degree of a curvature provides an increased function of yawing for the lure, and the use of a plate with a lesser degree of a curvature improves the function of surfacing.

The additional symmetrical projections in the front portion of the lure can be used to provide the yawing functions of the lure when posting in the water and create additional noise at appearing the lure onto the surface.

Fixing the tail hook is advisable only for the models designed for fishing in grassy or driftwood ponds as at arranging a single or double hook facing up in the rear portion of the lure, it is capable to overcoming the pond overgrown areas without snagging. For the same purpose, it is advisable to round up the front end of the load or the front end of the reinforcing plate protruding from the load.

Using the reinforcing plate increases the strength of the lure and provides the comfortable accommodation for the protruding rods and holes designed to fix lines and hooks.

The different ways to perform the performing rods are used depending on the lure model strength requirements, as well as the requirements for its presentation appearance.

Using synthetic or fur tassels on the tail hook is suitable for masking the hook, as well as for changing in the degree of yawing of the lure. Having own resistance at deviating sideways of the tail portion of the lure, the tassel reduces the amplitude of oscillations, increasing its size results in reducing the mode of yawing of the lure. Accordingly, in this case, there is increased the ability of the lure to appear onto the surface of water. Therefore, the use of the hooks without a tassel or with a tassel of a small size is advisable for the lures designed to operate at posting into the water column, with an enhanced ability to create active heterogeneous oscillations without appearance over the surface, thus the lure equipped in such a way can also be applied for operation over the surface using more flattened plate and a smaller load.

Furthermore, the use of the hook without a tassel or with a tassel of a small size is suitable for small models intended for long distance casting.

The lure ability to create vibrating oscillations when lowering to the bottom and also slow lowering in combination with a design compactness and significant weight of the lure allows, if necessary, to use the lure for jig fishing at stepped posting, whereat the lure after short pulls freely sinks. In this, the duration of its immersing time after casting is more than for other lures. Taking into account the active uplift of the lure when posting, it is necessary to implement it performing shorter steps, and in doing so make them slower than at the other posting techniques for jig lures.

The invention is illustrated by drawings, where:

Figure 1:
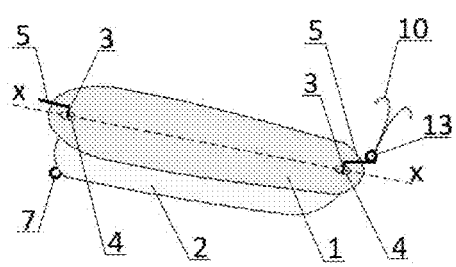
FIG. 1 shows the surface lure with a turned elongated curved plate.

The surface lure comprises longitudinally elongated curved plate 1 (FIG. 1, FIG. 2), metal load 2 (FIG. 1 to FIG. 5) performed as a longitudinally elongated piece that is flattened in the vertical plane with the upper edge being of narrowed and rectilinear or concave form in the middle portion thereof. In front of and behind metal load 2, there are provided two rods 3 (FIG. 1 to FIG. 5) projecting upwardly in the vertical plane above the upper edge of load 2 and threaded with a gap through holes 4 (FIG. 1, FIG. 2) of the longitudinally elongated and curved plate 1 located on the top of load 2. Holes 4 are performed in the front and rear portions of plate 1 on its longitudinal axis X-X (FIG. 1), which is also its axis of symmetry. Ends 5 of rods 3 are longitudinally separated apart (FIG. 1, FIG. 2, FIG. 4, and FIG. 5) or ends 6 are directed towards each other (FIG. 3).

The surface lure comprises the device for fixing the fishing line that is made in the form of eyelet 7 (FIG. 1, FIG. 2, FIG. 5) or vertical and flat projection 8 (FIG. 3, FIG. 4) in front of load 2 with hole 9 (FIG. 3, FIG. 4), which eyelet 7 or hole 9 are brought forward relative to the lure center of gravity and they are arranged in front of metal load 2 at its lower edge with the indentation downwardly relative to the longitudinal axis X-X of plate 1 (FIG. 1 to FIG. 5). The longitudinal side portions of longitudinally elongated and curved plate 1 are symmetrically bent downward relative to its longitudinal axis X-X. Plate 1 is attached to load 2 with the possibility of its (the plate) rotation about its longitudinal axis X-X in both directions through the same angle α from the position, at which the side edges of plate 1 are located symmetrically with respect to load 2 (FIG. 6). At least one hook 10 (FIG. 1, FIG. 2, FIG. 4, FIG. 5) at the tail portion of the lure is attached to load 2 at its rear portion or to the curved back convex end of rear rod 5.

Metal load 2 may be weighted at its front or rear portion. Inside metal load 2, there can be located a longitudinal reinforcing plate (FIG. 3, FIG. 4) that protrudes at top of the load (FIG. 3) and/or its ends protrude as vertical flat projections 11 behind (FIG. 3, FIG. 4) and/or in front of flat vertical projection 8 (FIG. 3, FIG. 4) of load 2. The front portion of metal load 2 may be performed extended and has cavities directed forward or downward at an angle, or it may be equipped with an additional spherical or oval concave petal disposed vertically and inclined downward at an angle so that eyelet 7 for fixing the fishing line could protrude from the middle portion of the concave surface of the oval petal.

Rods 3 may be performed protruding upward directly from the front and rear portions of load 2 (FIG. 1, FIG. 2, FIG. 5), or protruding upward directly from front 8 and rear 11 flat projections on the load ends (FIG. 3, FIG. 4), which projections being formed by the ends of the reinforcing plate. Turned ends 6 of rods 3 directed towards each other (FIG. 3) may be integrally connected or they cannot reach each other, or in addition, they may be turned downward to load 2 and threaded through two additional plate holes performed on its longitudinal axis.

Figure 2:
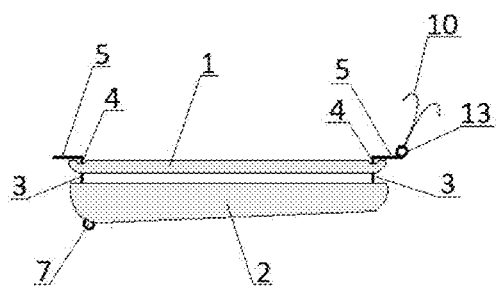
FIG. 2 shows the side view of the surface lure with the plate in the operating position.
Figure 3:
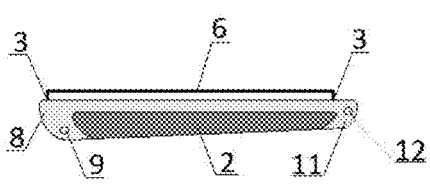
FIG. 3 shows the metal load with the reinforcing plate and the rods having the ends, which are connected together to form an integral unit, and with a hole for the hook located in the rear end of the reinforcing plate.
Figure 4:
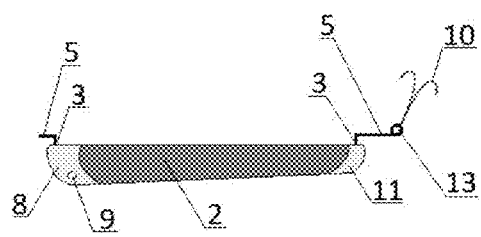
FIG. 4 shows the metal load with the reinforcing plate and the rods having the ends, which are longitudinally separated apart, and on the turned back end of the rear rod, there is made a loop for the hook.
Figure 5:
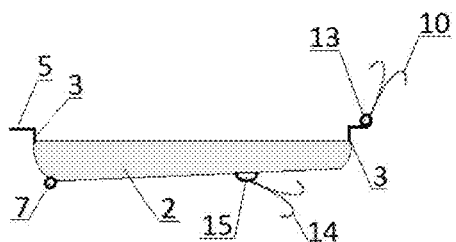
FIG. 5 shows the metal load without the reinforcing plate and with the additional hook.
Figure 6:
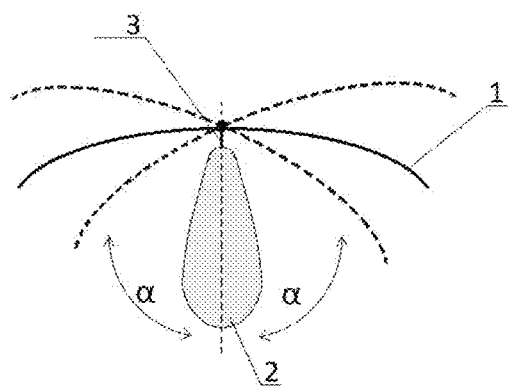
FIG. 6 shows the front view of the horizontally arranged lure with such a position of the plate whereat its side edges are symmetrical with respect to the load, and the plate itself is deflected from this position in the both directions through the same angle.

The device for fixing the fishing line may be performed as hole 9 in front of the lower edge of load 2, on the bottom edge of flat projection 8 formed by the rounded front end of reinforcing plate 1 (FIG. 3, FIG. 4) that protrudes in front of load 2, or as a loop or eyelet 7, made just at the rounded lower edge of the front portion of load 2 (FIG. 1, FIG. 2, FIG. 5).

Longitudinally elongated plate 1 can have rounded nose and tail edges or the symmetrical projections in the front portion, or the plate can be extended in the front, middle or rear portion.

The side portions of longitudinally elongated plate 1 that are symmetrically curved down may have the same or different degree of curvature for the front and rear portion, and the curvature may be of cylindrical, conical, spherical, faceted or combined form, or the plate may have a higher degree of curvature of the middle portion along the longitudinal axis and flattened or flat portions along the side edges.

Longitudinally elongated plate 1 may have at its front portion, or along thereof, either one or two cavities of globular, spherical, conical or combined form with a greater degree of curvature of the rear surface of the cavity, which can be performed with complementary holes in the upper portion of each cavity, and the cavities can be symmetrically stamped relative the longitudinal axis and arranged with their concave surface on the lower concave surface of the plate, or on the longitudinal axis of the plate, there can be formed the additional holes.

Longitudinally elongated plate 1 may have a nose edge being further symmetrically bent up or down, or it may have side edges in the middle and/or in the front portion of the plate being further symmetrically bent downward. Longitudinally elongated plate 1 may be made of metal or plastic and of the same thickness or with the thinner side portions.

Hook 10 in the tail portion of the lure may be movably connected to the load of the lure with the help of hole 12 performed in flat projection 11 behind load 2 (FIG. 3), which projection being created by rear end 11 of the reinforcing plate protruded thereof, or via the eyelet protruding backward from the rear end of the load, or via loop 13 formed at the bent-back end of rear projecting rod 5, or it may be attached fixedly at those points.

Hook 10 at the tail portion of the lure may be provided with synthetic or fur tassel being attached with the possibility of removal (not shown).

The surface lure comprising at least one hook 10 in its tail part (FIG. 1, FIG. 2) may also have optional hook 14 (FIG. 5), which is movably mounted to eyelet 15 (FIG. 5) performed in the middle portion of load 2 on its lower edge.

The claimed surface lure operates as follows.

Figure 7:
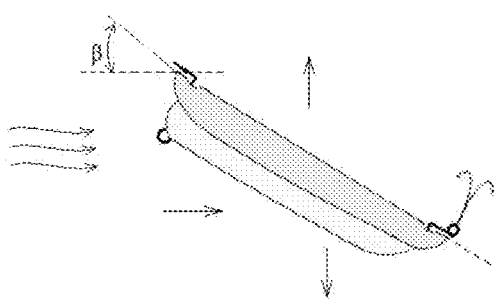
FIG. 7 shows the position of the surface lure at the beginning of the movement.
Figure 8:
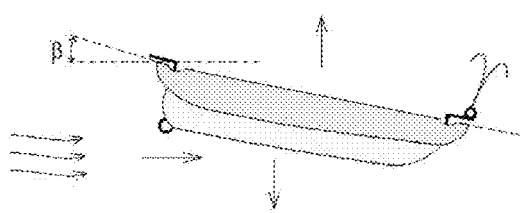
FIG. 8 shows the position of the surface lure in the course of the movement.

After casting the lure and entering it into water, because of the fact that the lure has longitudinally elongated load 2 at its lower portion and longitudinally elongated curved plate 1 attached thereto on its top longitudinally or with a slight angle to the longitudinal axis of the load, the lure flips from any initial position so that its load 2 occurs below, namely, under plate 1 (FIG. 7, FIG. 8).

At the beginning of the movement, the lure occurs facing with its nose portion the direction of movement, while the nose portion of the lure, whereto, there is applied a component of moving horizontal and vertical buoyancy forces, which are transmitted from the fishing line, occurs significantly elevated relative to its tail portion (FIG. 7). In the course of the lure movement, plate 1 located above load 2 is arranged longitudinally and at angle β in the vertical plane to the direction of the lure, and plate 1 as being rotatable about its longitudinal axis X-X, always returns to the position, whereat its nose portion is raised above the rear portion (FIG. 8), and the side edges are arranged symmetrically with respect to load 2 (FIG. 6). At the beginning of the movement, the lure, with its front portion hanging on the fishing line, and with its rear portion hanging down under the force of gravity, is located in the vertical plane at large angle β relative to the flow of water (FIG. 7). At the lowest speed, the lure moves in the flow of water so that plate 1 has the greatest drag, which, when driving the lure, provides warning of its rapid subsidence during acceleration. Under such a condition, upon the lure reaching optimal speed, whereat there is performed posting, the lifting force applied to plate 1 increases, and, therefore, there decreases angle β in the vertical plane, that is angle, under which the lure is located relative to the oncoming flow of water (FIG. 8).

Due to the fact that the fishing line is attached to the lure at its front and low portion, namely, at the point extending downwardly from the longitudinal axis of plate 1, subsequent increasing in speed does not bring lure plate 1 and, consequently, the lure itself into the position, whereat longitudinal axis X-X of the plate is parallel to the oncoming flow of water.

In the course of the subsequent movement at the operating speed of posting, depending on the design features of the lure, the lifting force may exceed the force of gravity that deepens the lure, or be less than the force of gravity of the lure. Accordingly, in the first case, in the course of posting, the lure rises to the surface, and in the second case, while moving, it continues deepening just to the point, whereat being directed upward, the buoyant force resulted from the fishing line resistance to the flow of water and increasing as deepening the lure, as well as the lifting force arising on the plate of the lure, in conjunction, are balanced with the force of gravity of the lure. In this case, the lure, having deepened to a certain depth, will continue to move at this depth.

Thus, lure plate 1 at moving in the water and locating in the vertical plane at angle β to the oncoming flow of water, with the nose portion raised relative to its rear portion, performs the function of a wing, whereto there is applied the lifting force, which is directed vertically upward, this lifting force being resulted from bypassing of plate 1 surface disposed at an angle β towards the flow of water by the oncoming flow of water (FIG. 8).

In the course of performing the uniform motion in the flow of water, plate 1 is positioned relative to the flow of water so that the flow runs against the concave lower surface of the plate, since the side edges of plate 1 are bent downward. At starting the lure movement under the action of the oncoming flow of water, the plate is pressed against the stop upward via the vertical projections formed on load 2, and it occupies the working position, wherein the upper curved surface of plate 1 rests on the bent ends of the vertical projections that restrict its further movement (FIG. 2). As in the operating position, plate 1 performs oscillations in the course of operation under any condition up to the full stop of the lure. As in a working position, the longitudinal axis of plate 1 is parallel to the longitudinal axis of load 2, or it is disposed at a small angle to the same.

During the movement of the lure, when passing flow along the concave surface of the plate, there are occurred the forces of turbulence that deflect plate 1 to one of the sides of its average intermediate position, in which the curved side edges of plate 1 are arranged symmetrically with respect to load 2 of the lure.

Thus, plate 1 is positioned to the flow of water with its low concave surface not only at angle β to the direction of the movement in the vertical plane, but it also deviates from the direction of the movement through the certain angle also in the horizontal plane. In doing so, on the inner surface of the plate that is deflected to the side, except for the lifting force, there occurs the lateral force in the horizontal plane directed to that side, whereat there is a lateral edge of plate 1, which is lowered down. This force deflects the direction of the lure movement from the direction of its movement in the horizontal plane, and as a result of the action of the lifting force, which at this moment is correspondingly reduced but not eliminated; the lure is also deflected upwards in the vertical plane. The degree of the plate deflection sideways and, respectively, the magnitude of the created lateral force directly depend on the speed of the lure, and it increases with increasing the speed.

In the course of the lure movement under the forces of turbulence, plate 1 is continuously rotating from side to side (FIG. 6) with the angles of rotation of the plate relative to the body that depends on the speed of the lure. Accordingly, being in motion, the lure oscillates from side to side with amplitude that increases with increasing the speed of the lure. In addition, when stopping, the tail portion of the lure deepens more than the nose portion with a fishing line attached thereto, therefore, the lure takes a position, whereat there are increased angle β between the longitudinal axis of the lure and oncoming stream of water (FIG. 7). As after the design of the lure, plate 1 can rotate independently of load 2 and the other structural elements of the lure, without resistance resulted from inertia forces, the lure starts operating from the very beginning of its motion while remaining in the state of performing oscillations almost to the complete stop of the lure. Upon renewal of the lure movement, plate 1 having enlarged angle β relative to the oncoming flow of water rotates sideways about its longitudinal axis with a greater angle than when the lure moves evenly. Therefore, despite the low rate at the lure renewal movement after stopping or directly after casting, the lure even with plate 1 having a small degree of curvature, which is designed for posting over the surface of the water, performs yawing oscillations after beginning of motion.

After reducing angle β (FIG. 8) of plate 1 deflection up to the value of the operating angle, the lure moving at a low speed creates high-frequency vibrating oscillations and moves rectilinearly. With increasing speed, the vibrating oscillations again are transferred into the oscillations with a greater amplitude and low frequency. In the process of the further uniform motion, the lure with plate 1 having significant degree of curvature maintains the mode of yawing motion of smaller amplitude, and the oscillations of the lure with flattened plate 1 that starts moving are gradually transferred into vibrations.

Since the deflection of plate 1 sideways until it stops (FIG. 6) takes longer than its deflection for a smaller angle, in the process of the motion, the lure starts yawing not moving in a straight line but creating a serpentine path. In this, the flattened load of the lure also begins oscillating from side to side deflecting from the vertical plane and contributing to the creation of the yawing movement of the lure. The transition from the vibrating oscillations to the yawing oscillations occurs upon conditions, whereon the less speed, the greater the degree of curvature of the plate of the lure. In this, flattened load 2 of the lure also starts leaning from side to side with deflecting from the vertical plane and contributing to the lure yawing. Plate 1 is attached to load 2 above its upper edge that is deflected aside more than the lower edge, whereon there is fixed the fishing line, so in addition to increasing the angle of the longitudinal axis of plate 1 with respect to the oncoming flow of water, due to rotation of plate 1 relative to load 2, at this moment of motion, there is additionally increased the angle of deflection of the longitudinal axis of the plate from the direction of the plate movement in the horizontal plane, owing to inclination of load 2. After deflection to one side, plate 1 begins rotating in the other direction, respectively, load 2 is inclined in the opposite direction, which results in inclination of the upper edge of load 2 with plate 1 in the opposite direction with a corresponding additional increase of the angle of inclination of the longitudinal axis X-X of plate 1 relative to the direction of the movement of the lure in the horizontal plane. Thus, the lure increasingly deviates from the direction of its movement to the side, carrying out yawing. The lure transition from vibrating oscillations to yawing oscillations occurs on the conditions, whereon the less speed, the greater the degree of the curvature for plate 1 of the lure.

Such conditions of the lure oscillations are kept in the case of sharp changes in speed of the lure movement, for example at jerks, which thing provides different opportunities for posting the lure, namely, either for uniform posting with different types of oscillations, or for posting by jerks (twitching type of posting). As a result of sharp increasing in speed of the lure at twitching type of posting, it is sharply deflected to the side, and at the termination of the movement it stops in the above said deflected position. Since the deviation of plate 1 occurs to that side, whereto the plate was deflected at the moment of jerk, at posting by jerks, the lure is deflected in different directions while rising upwards. In addition, since the weight of the lure is located longitudinally from the nose portion to the tail portion of the lure, upon completion of the lure jerk, its nose portion with the fishing line, which creates resistance to the movement, stops earlier than the tail portion, which has a certain period of time to go on deflecting, thereby after each jerk, the lure is deflected from the direction of its movement with the angles of deflections of the lure directions at jerks from the straight trajectory in both directions, and this angle being up to 60 degrees, in doing so, the lure is covering considerable distances in the both sides of the conditional direction of the movement.

When stopped, owing to plate 1 located above load 2 and acting like a parachute, the lure slowly descends, and at the same time it continues vibrating that, except for twitching, also provides alternating the movement of the lure with the pauses, which can often challenge a predator attack. Moreover, at slow lowering, the vibration of the lure allows using it for a jig technique with alternating short pulls and stops.

In addition to providing for the oscillations of the lure, rotations of plate 1 influence on its ability to float to the surface of water during the movement. Thus, the maximum lifting force occurs when plate 1 is located in the intermediate and middle position, wherein its side edges are arranged symmetrically relative to load 2. When plate 1 is rotating aside, the lifting force is reducing proportionally to the degree of rotation of plate 1. Thus, in the course of the lure movement, the lifting force arising on plate 1 has the maximum value in the middle position and the minimum value at the ultimate turn of plate 1 aside and relative to its longitudinal axis X-X. Accordingly, the lifting force of plate 1 that is turned to the stop in the course of the lure motion, at the greater value of speed, becomes less in the comparison with the lifting force of the lure, which is moving slowly but with a small degree of deflection of plate 1.

Since during the movement of the lure at a low speed, plate 1 oscillates with a high frequency and with a small angle of rotation relative to its longitudinal axis X-X, on this condition of operation, plate 1 creates a greater magnitude of the lifting force than when the lure moves at greater speed, whereat plate 1 is turned through limiting angle α (FIG. 6).

This property provides the ability to output the lure on the surface when driving it at low speed, at which the lifting force exceeds the force of gravity of the lure.

The ability to maintain the lure on the surface when driving it at low speed of posting allows its using in the shallow waters or in the areas where the water barely covers the sea grass beds.

When driving over the surface of water, the lure continues to vibrate. On entering the surface of water with the front edge of the curved surface of plate 1, into the space under it, there is sucked some amount of air, which provides gurgling even at slight deepening. In doing so, the uniformly moving lure that looks like a fish feeding at the surface makes squishing and gurgling sounds that attract predators. The waves diverging from the lure are an additional factor that attracts predators.

Furthermore, the lure that uniformly moves directly near the surface of water, on performing acceleration of motion, starts jumping above the surface of water, captures air with the concave surface of the plate, then deepens into water again with making gurgling sounds and splashes. In practice, such jumps are provided by sharp acceleration of the coil rotation or a light jerk of the fishing rod in the course of uniform posting.

In the process of posting the lure, it is possible either to create the continuous series of the jumps of the lure over the surface of water, or combine uniform or intermittent posting underwater with periodic jumping up and down, or with passing of separate parts over the surface of water together with sucking air, or perform continuous or twitching posting only underwater. As jumping is gently implemented, at the discretion of a fisher, in the process of posting, there can be provided outputting over the surface of water either of the whole lure, or only of the front portion of the same.

Immediately after casting the lure, because of its compactness and considerable mass, it deepens into water at a certain depth. After casting the lure deepened to a certain depth, to bring it into the mode of posting over the surface of water or jumps, it is necessary to perform slow and uniform posting up to the lure output to the surface to be visible and recognized owing to the diverging waves, or the lure nose portion protruding above the surface of water, as well as sharp weakening of the resistance force of the lures transmitted through the fishing rod. Then there is need in making accelerated under winding of the spool (coil) or the fishing rod jerks causing the appearance of the lure over the surface of water.

To use the lure exclusively in the water column, after casting, it is necessary to keep a pause, in the course of which the lure deepens to a certain depth, then to perform uniform posting at a slow speed required to maintain the lure at the surface of water without its output, or to increase the speed before the lure transition into the mode of yawing oscillations, or perform intermittent or twitching posting. There is possible to apply combined posting, whereat some part of the distance is passed with the outputs over the surface, and another part is passed in the surface layer of water.

The invention claimed is:

1. A surface lure comprising:
   a longitudinally elongated plate, the longitudinally elongated plate running through an entire length of the surface lure, the longitudinally elongated plate having a longitudinal central axis, lateral portions of the longitudinally elongated plate symmetrically curved downwards relative to the longitudinal central axis of the plate, a front portion that is wider than a rear portion, a first hole located at the longitudinal central axis in the front portion of the longitudinally elongated plate, a second hole located at the longitudinal central axis in the rear portion of the longitudinally elongated plate;
   a longitudinally elongated metal load movably attached to the elongated plate, the plate is rotatable about the longitudinal central axis thereof, the metal load is formed flattened in a vertical plane and runs through the entire length of the surface lure, the metal load includes a front portion, a rear portion, a narrow rectilinear top edge, a bottom edge, a first rod being motionless relative to the metal load and located at the top edge of the metal load in the front portion of the metal load, a second rod being motionless relative to the metal load and located at the top edge of the metal load in the rear portion of the metal load, the first rod projects upwardly from the top edge of the metal load and includes a rectilinear portion directed upwards and also a rectilinear portion horizontal portion formed by a bend and facing a first direction, the second rod projects upwardly from the top edge of the metal load and includes a rectilinear portion directed upwards and a rectilinear horizontal portion formed by a bend and facing a second direction, the first direction is opposite to the second direction;
   a device for fixing a fishing line located at the bottom edge in the front portion of the metal load, the device for attaching the fishing line is indented down from the longitudinal axis of the longitudinally elongated plate in the front portion of the metal load and brought ahead relative to a center of gravity of the metal load;
   at least one eyelet to attach a hook is located at the rear portion of the metal load and is motionless with respect to the metal load;
   the metal load is attached to the longitudinally elongated plate by passing the rectilinear portion directed upwards of the first rod of the load through the first hole of the longitudinally elongated plate and the rectilinear portion directed upwards of the second rod of the metal load through the second hole of the longitudinally elongated plate;
   a diameter of each one of the first hole and the second hole of the plate is greater than a diameter of each one of the first and second rods forming a gap between each of the first and second rods and a circumference of a corresponding one of the first and second holes.

2. The surface lure as claimed in claim 1, wherein the metal load is weighted at the front portion.

3. The surface lure as claimed in claim 1, wherein the metal load includes a reinforcing plate inside thereof.

4. The surface lure as claimed in claim 1, wherein the front portion and the rear portion of the longitudinally elongated plate are rounded.

5. The surface lure as claimed in claim 1, wherein the longitudinally elongated plate is made of metal or plastic.

6. The surface lure as claimed in claim 1, further including a second eyelet for attaching a second hook at the bottom edge of the load.

7. The surface lure as claimed in claim 1, wherein the at least one eyelet to attach the hook is connected to the metal load directly or via the second rod.

\* \* \* \* \*